W. KRAFVE.
EXHAUST MANIFOLD.
APPLICATION FILED DEC. 31, 1920.
1,431,120.
Patented Oct. 3, 1922.
2 SHEETS—SHEET 2.
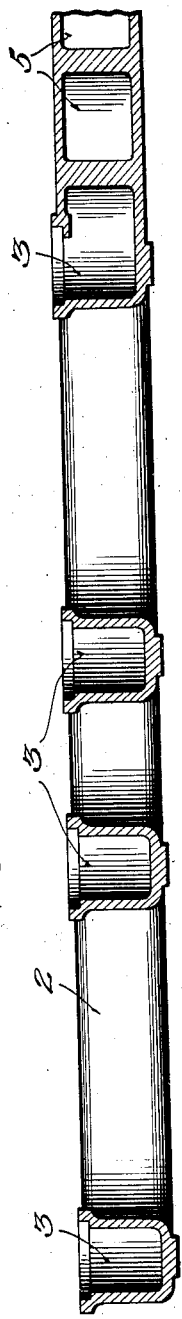
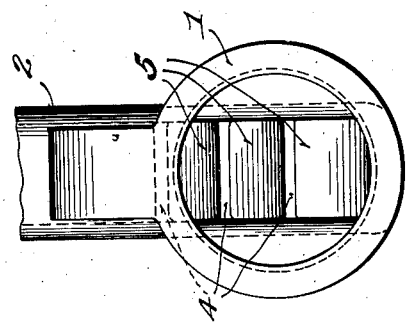
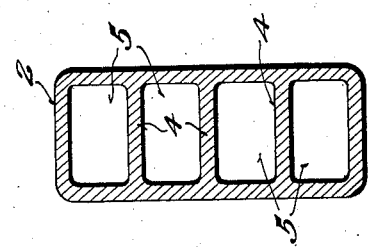
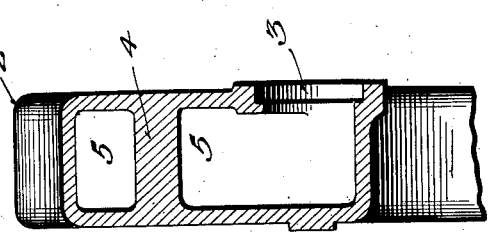
INVENTOR.
William Krafve
BY
Joseph A. Miller
ATTORNEY Patented Oct. 3, 1922.

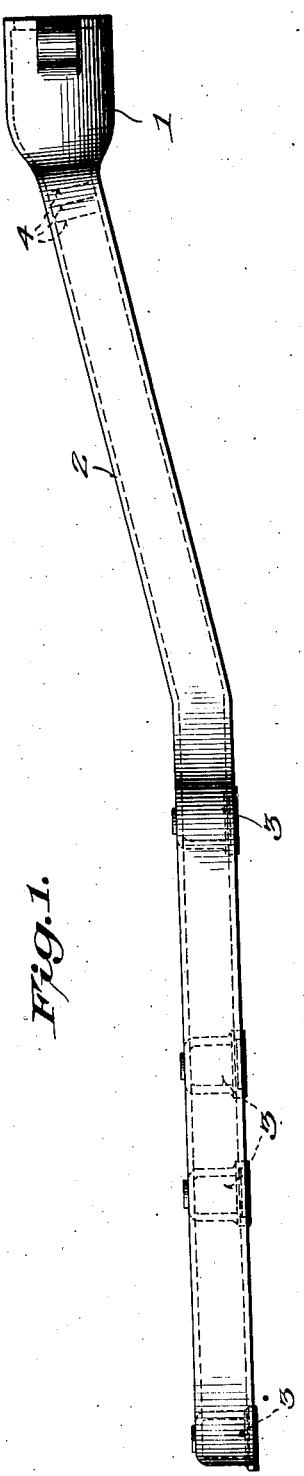
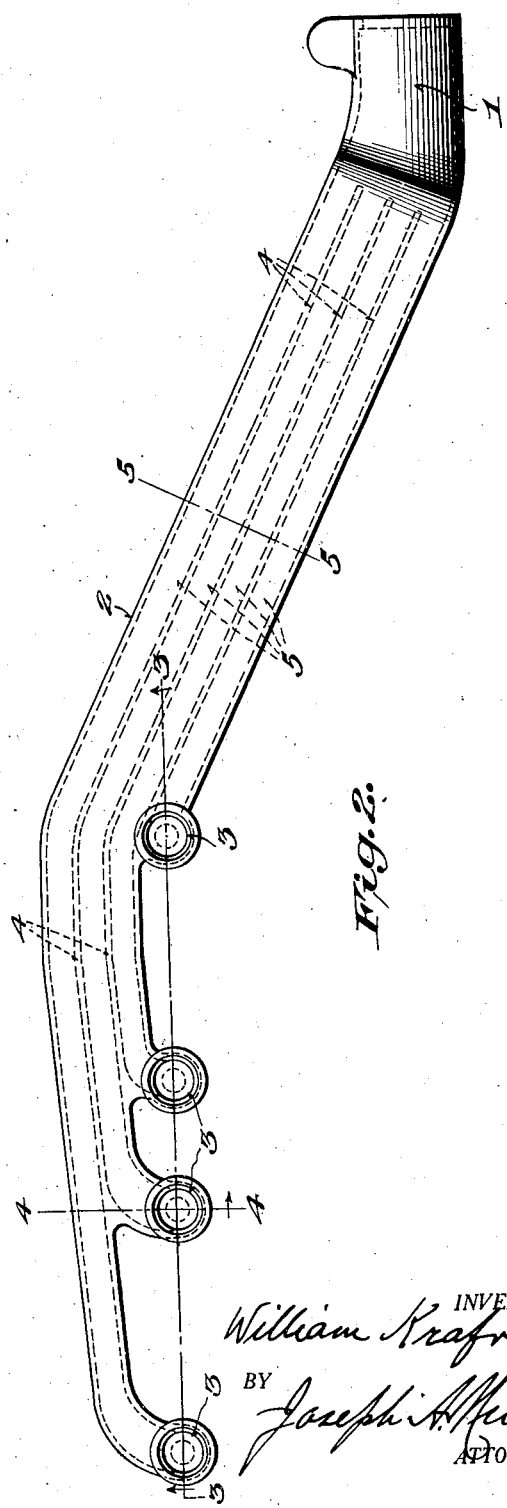

1,431,120

UNITED STATES PATENT OFFICE.

WILLIAM KRAFVE, OF OAKHAM, MASSACHUSETTS.

EXHAUST MANIFOLD.

Application filed December 31, 1920. Serial No. 434,321.

*To all whom it may concern:*

Be it known that I, WILLIAM KRAFVE, a citizen of the United States, residing at Oakham, in the county of Worcester and State of Massachusetts, have invented new and useful Improvements in Exhaust Manifolds, of which the following is a specification.

This invention relates to certain new and useful improvements in exhaust manifolds, and the primary object thereof, is to provide a manifold which has separate conductors for each of the cylinders, which conductors each merge into the muffler, the conductors being independent of one another, whereby to reduce the objections as to noise and the like usually attendant upon the use of mufflers.

A further object of the invention is to provide such conductors or passages so as to permit the gas to be broken up into separate small bodies as distinguished from a single large body, to thus allow the gases in individual or small bodies to each expand gradually prior to entering the muffler, thereby to more effectually reduce the noise or silence the exhaust of the gases.

A further object of the invention is to provide a manifold of this type wherein the gases are given an angular path of travel prior to reaching the muffler, to thus allow more complete and gradual expansion of the gases.

The invention further aims to provide a manifold which is of simple and compact construction and which is of strong and durable character.

Further and other objects will be later set forth and manifested in the course of the following description.

In the drawings:

Fig. 1, is a top plan view of the invention;

Fig. 2, is a side elevation;

Fig. 3, is a section on line 3—3 of Fig. 2;

Fig. 4, is a similar view on line 4—4 of Fig. 2;

Fig. 5, is a similar view on line 5—5 of Fig. 2; and

Fig. 6, is an end elevation looking at a portion of the muffler, to the right of Figs. 1 and 2.

In proceeding in accordance with the present invention, a muffler 1, is provided which may be of any character or desired form. Preferably integral with the muffler and extending outwardly from the rear thereof, is an elongated and curved or angularly formed hollow body providing a duct or passage 2, which latter is preferably formed integral with a series of inlets 3, here shown as four in number, since the invention is illustrated for example, in connection with a four cylinder engine. These inlets are formed at the opposite end of the duct or passage 2, as shown.

A series of partitions 4 are formed or cast or otherwise secured within the interior of the duct or passage 2, thereby to form a separate or independent conductor 5, for each inlet, which conductors, all merge or discharge into the muffler 1, as depicted especially in Fig. 2, of the drawings. These partitions are arranged or formed in any suitable manner so as to provide a completely independent conductor for each inlet which conductors all lead into the muffler, so that the exhaust gases from each cylinder will be prevented from contacting with or merging into the gases of the other cylinders, until the muffler is reached.

As is depicted in the drawings, each passage is of angular or curved form, which causes the exhaust gases to have a corresponding path of travel from the cylinders to the muffler, thus assisting in the reduction of the noise by allowing the gases to gradually expand prior to reaching the muffler, resulting in a long travel of the gases in small bodies in seeking the muffler. In addition, the partitions act to brace, reinforce and strengthen the main duct or passage 2, and provide a strong and rigid construction. As shown in Fig. 1, the part of the main duct or passage 2, between the muffler and the next adjacent cylinder, is arranged at an angle, thus giving the gases a further angular path of travel, so as to increase the extent and vary the direction of the travel of the gases before reaching the muffler.

From the foregoing it will be seen that instead of the gases entering the muffler in a single large body, they are divided into a series of smaller bodies, one for each cylinder, and that such small bodies are given a double angular path of travel, i. e., in two directions, vertically angular and horizontally angular. The gases are thus permitted to expand in individual small bodies both gradually and with greater speed than in the instance of a single large body, resulting in silencing of the noise or reduction thereof to a marked degree.

Having thus described my invention, what I claim as new and desire to secure by Letters Patent is:—

1. In an exhaust manifold, a body provided with a series of partitions extending lengthwise thereof and arranged in approximate parallelism and at equal distances apart to form a series of separate passages each independent of the others and all of approximately equal cross-sectional area, the partitions being successively extended at one end beyond one another to provide an inlet for each of the passages in conjunction with the adjacent partition extension.

2. In an engine exhaust manifold, a body having an outlet and having a series of partitions therein arranged to form a series of separate and independent passages the latter being each of approximately equal cross-sectional area, and a single inlet for each of the passages whereby to afford an individual exhaust passage for each cylinder of the engine from the inlet to the outlet of the manifold.

3. In an engine exhaust manifold, a body having an outlet and having a series of separate and independent passages one for each cylinder, and a single inlet for each passage whereby to afford an individual exhaust passage for each cylinder of the engine from the inlet to the outlet of the manifold.

In testimony whereof I have signed my name to this specification in the presence of two subscribing witnesses.

WILLIAM KRAFVE.

Witnesses:
MARION A. KINGSLEY,
J. A. MILLER.